US005357073A

United States Patent [19]

Tominaga et al.

[11] Patent Number: 5,357,073

[45] Date of Patent: Oct. 18, 1994

[54] ELECTRICAL DISCHARGE MACHINE

[75] Inventors: Takayuki Tominaga, Chiryu; Michio Hisanaga, Nagoya; Tadashi Hattori, Okazaki, all of Japan

[73] Assignee: Nippondenso Co., Ltd., Kariya, Japan

[21] Appl. No.: 27,532

[22] Filed: Mar. 8, 1993

[30] Foreign Application Priority Data

Mar. 9, 1992 [JP] Japan .................................. 4-050947

[51] Int. Cl.[5] ............................................ B23H 1/04

[52] U.S. Cl. ............................................ 219/69.15

[58] Field of Search ........................... 219/69.15, 69.17

[56] References Cited

U.S. PATENT DOCUMENTS

| | | | |
|---|---|---|---|
| 4,121,081 | 10/1978 | Baker | 219/69.15 |
| 4,467,200 | 8/1984 | Kalwar et al. | 219/69.17 |
| 5,286,944 | 2/1994 | Li | 219/69.15 |

FOREIGN PATENT DOCUMENTS

| | | | |
|---|---|---|---|
| 54-67532 | 5/1979 | Japan . | |
| 55-65032 | 5/1980 | Japan . | |
| 56-156763 | 12/1981 | Japan . | |
| 57-194826 | 11/1982 | Japan | 219/69.15 |
| 61-178123 | 8/1986 | Japan | 219/69.15 |
| 62-84920 | 4/1987 | Japan | 219/69.15 |
| 2131825 | 5/1990 | Japan . | |
| 1463411 | 3/1989 | U.S.S.R. | 219/69.15 |
| 2200581 | 8/1988 | United Kingdom | 219/69.15 |

OTHER PUBLICATIONS

Precision Machining of Micro Spindles (1st Report) Masuzawa, T. et al. pp. 14–23 No Publication Date.

Precision Machining of Micro-holes and Micro-punches with EDM, Sato, T. et al.-pp. 29–33 No Publication Date.

Sakakibara Appln. No. 07/935,104 No Publication Date.

*Primary Examiner*—Geoffrey S. Evans

*Attorney, Agent, or Firm*—Cushman, Darby & Cushman

[57] ABSTRACT

An electrode for electrical discharge machining. This spark-machining electrode improves the accuracy at which the workpiece is machined by electrical discharge machining. The electrode can dispense with a mechanism which scans the spark-machining electrode or the workpiece. A plurality of needlelike electrodes are formed on the surface of the spark-machining electrode. The needlelike electrodes are so arranged that they are present in craters created by their respective adjacent needlelike electrodes. The plural electrodes form a group. The shape of the surface of this group is formed according to the desired shape to be formed in the workpiece. Art electric discharge occurs mainly at the tips of the needlelike electrodes and so the capacitance is smaller than the capacitance of the prior art flat-plate electrode. Also, the energy of a single electric discharge can be reduced. Furthermore, electric discharge at the side surfaces of the needlelike electrodes can be suppressed because of the effect of concentration of electric field.

8 Claims, 6 Drawing Sheets

14 5a 5 H 13 13 12 d g D L 12 12 11

ELECTRICAL DISCHARGE MACHINE

BACKGROUND OF THE INVENTION

1. Field of the Invention

The present invention relates to the structure of an electrode used for electrical discharge machining which is employed for an electrical discharge machine that machines a workpiece by the action of electric discharge and, more particularly, to an electrode capable of machining parts having intricate shapes by electrical discharge machining.

2. Description of the Related Arts

Conventional methods of intricately spark-machining workpieces include a method utilizing photolithography adapted to machine semiconductors, a method using an LIGA process, and a method of machining a workpiece into a desired shape by electrical discharge machining. In the method using the LIGA process, a photosensitive material is molded, using synchrotron radiation. Then, the material is plated with a metal. Thus, the material is machined into a desired shape.

The electrical discharge machining which is also known as electron discharge machining, electric spark machining, electroerosive machining, and electrospark machining is described now. The following three kinds of electrodes can be employed for electrical discharge machining.

A first kind of electrode is an electrode 20 shown in FIG. 11. This electrode 20 takes the form of a flat plate and is provided with a plurality of holes 20*a*. A workpiece 21 is mounted opposite to the electrode 20. A power supply 22 for electrical discharge machining applies a voltage, which produces an electric discharge from the flat-plate electrode 20 to thereby machine the workpiece 21.

A second kind of electrode is a single needlelike electrode 23 shown in FIG. 13. A voltage is applied between the electrode 23 and a workpiece 21 to create an electric discharge. Utilizing this discharge, holes are formed in the workpiece 21. Since the area of the front end of the electrode 23 is much smaller than the area of the flat-plate electrode 20, the energy of a single electric discharge is small. Hence, the machining accuracy can be enhanced.

A third kind of electrode is a wire electrode 24 shown in FIG. 14. A voltage is applied between the wire electrode 24 and a workpiece 21. At the same time, the workpiece 21 is rotated. In this manner, the workpiece is machined into a needlelike shape. During the machining, the wire electrode 24 is fed in to suppress the wear of the electrode due to the electric discharge. Also, the machining accuracy can be improved.

However, where a workpiece 21 is machined so as to leave minute regions, or minute cylindrical portions 21*a*, as shown in FIG. 12 by the prior art machining techniques, various difficulties arise.

In the method using photolithographical techniques principally relying on etching used to machine semiconductors, if the height of the cylindrical portions 21*a* shown in FIG. 12 reaches tens of microns, lateral etching also occurs, thus deteriorating the dimensional accuracy.

In the LIGA process, the cost is very high because of the use of synchrotron radiation.

Furthermore, in the prior art method making use of electrical discharge machining, the machining accuracy and the machining time present problems. The problems with the above-described electrode structures are described next.

Where the flat-plate electrode 20 shown in FIG. 11 is used, the area of the electrode is large and so the energy produced by a single electric discharge is large. Therefore, the outer surfaces of the cylindrical portions 21*a* formed by the holes 20*a* tend to be uneven. Consequently, it cannot be anticipated that high machining accuracy is obtained.

Where the single needlelike electrode 23 shown in FIG. 13 is used, it may be possible to enhance the accuracy at which the cylindrical portions 21*a* shown in FIG. 12 are machined, by scanning the electrode 23 or the workpiece 21. However, the machining time is increased. Furthermore, a mechanism for scanning the electrode 23 or the workpiece 21 is needed. Also, measures must be taken against the wear of the electrode 23.

Where the wire electrode 24 shown in FIG. 14 is employed, the wear of the electrode can be suppressed but the machining time is prolonged. Also, a mechanism for scanning the electrode or the workpiece is needed. In addition, the machining accuracy is lower than the machining accuracy obtained where the needlelike electrode 23 is used, because the electric-discharge area at the front end of the wire electrode is wider than the electric-discharge area of the needlelike electrode 23.

SUMMARY OF THE INVENTION

It is a first object of the present invention to provide an electrode (hereinafter often referred to as the spark-machining electrode) which is used for electrical discharge machining and which is comparable in machining accuracy to the prior art single needlelike electrode and does not need any complex mechanism for scanning the electrode or the workpiece.

It is a second object of the invention to provide a spark-machining electrode which accomplishes the above-described first object and is capable of accurately forming convex portions of desired form on a workpiece.

It is a third object of the invention to provide a spark-machining electrode which accomplishes the above-described first object and is capable of accurately forming recesses of desired shape in a workpiece.

It is a, fourth object of the invention to provide a spark-machining electrode which accomplishes the above-described first object and is capable of accurately forming desired shapes having varying heights on a workpiece.

The first object is achieved by a first structure in which groups of needlelike electrodes are formed on the surface of the spark-machining electrode and the needlelike electrodes are arranged in craters created by their respective adjacent needlelike electrodes.

The second object is achieved by a structure which has the features of the first structure and in which the base plate of the spark-machining electrode and the groups of the needlelike electrodes have holes larger than the craters.

The third object is achieved by a structure which has the features of the first structure and in which the groups of the needlelike electrodes are spaced apart from each other such that the craters created by the adjacent groups of the needlelike electrodes are spaced apart from each other.

The fourth object is achieved by a structure which has the features of the first structure and in which the groups of the needlelike electrodes have varying heights.

Where the novel electrode is used for electrical discharge machining, an electric discharge starts at the tips of the needlelike electrodes which could produce electric discharge most readily immediately prior to the machining. As the electric discharge progresses, the distance between each needlelike electrode and the workpiece increases. Then, the needlelike electrodes which could produce electric discharge less easily create an electric discharge. In this way, successive electric discharges occur, whereby the workpiece is machined. In the machined workpiece, the craters formed in the adjacent needlelike electrodes overlap with each other and hence do not reflect the shape of the needlelike electrodes but reflect the shapes of the groups of the needlelike electrodes.

Also, the area of the tip of each needlelike electrode is small. Therefore, the energy of the electric discharge which is proportional to the capacitance between the tip of each needlelike electrode and the workpiece is also small. In consequence, the accuracy at which the workpiece is machined is enhanced. Furthermore, the total area of the surfaces of the needlelike electrodes is larger than the area of the surface of a flat-plate electrode. During electric discharge, a dielectric oil is circulated through the gaps between the needlelike electrodes and so heat is dissipated effectively. This also improves the machining accuracy.

Successive electric discharges take place on each individual needlelike electrode and trigger electric discharges on all the groups of needlelike electrodes. Hence, a mechanism which scans the spark-machining electrode or the workpiece is made unnecessary.

The second structure has the features described above. In addition, convex portions conforming in shape to the holes formed inside the groups of the needlelike electrodes can be accurately machined in the workpiece simultaneously.

The third structure has the features described above. In addition, concave portions conforming in shape to the separate shapes of the groups of the needlelike electrodes can be accurately machined in the workpiece simultaneously.

The fourth structure has the features described above. In addition, shapes conforming to the shapes of the groups of the needlelike electrodes having varying heights can be machined accurately simultaneously.

Other objects and features of the invention will appear in the course of the description thereof which follows.

DESCRIPTION OF THE PREFERRED EMBODIMENTS

Figure 1:
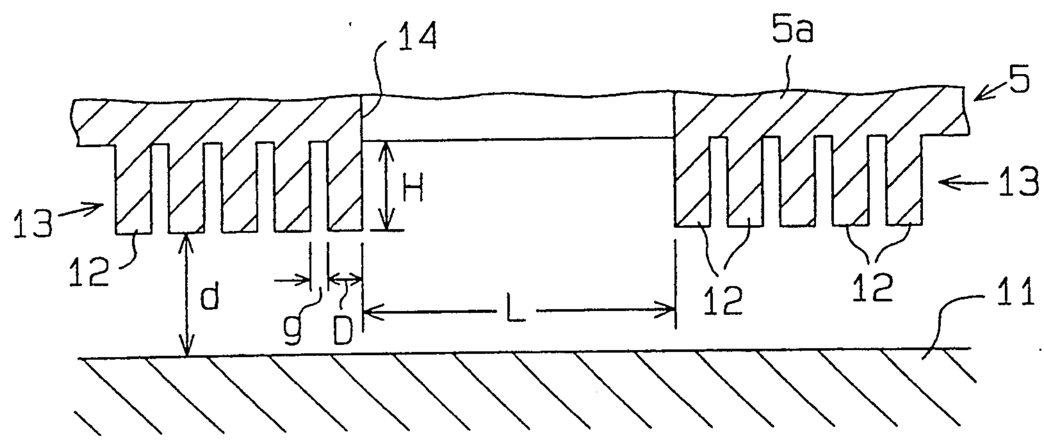
FIG. 1 is an enlarged cross section of main portions of needlelike electrodes according to the invention and a workpiece, and in which an electrical discharge machining operation is not yet performed.
Figure 2:
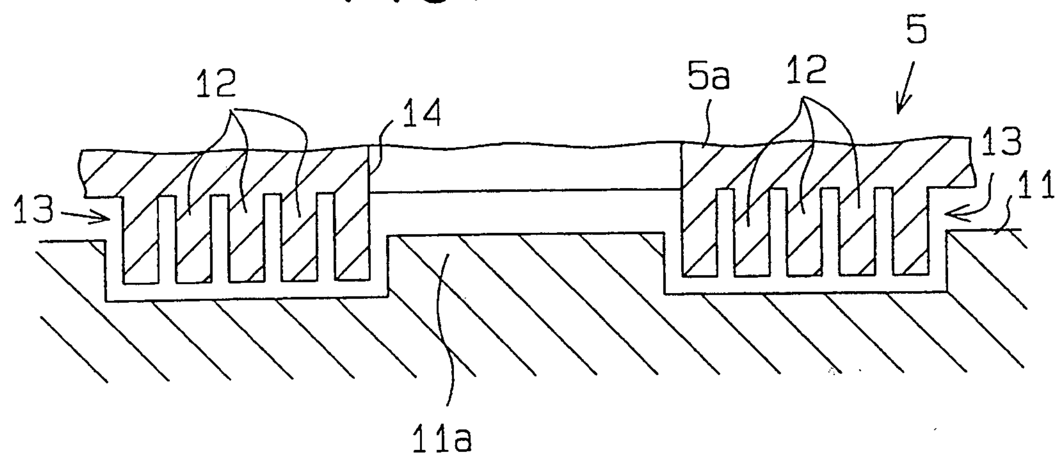
FIG. 2 is an enlarged cross section similar to FIG. 1, but in which an electrical discharge machining operation is being performed.
Figure 3:
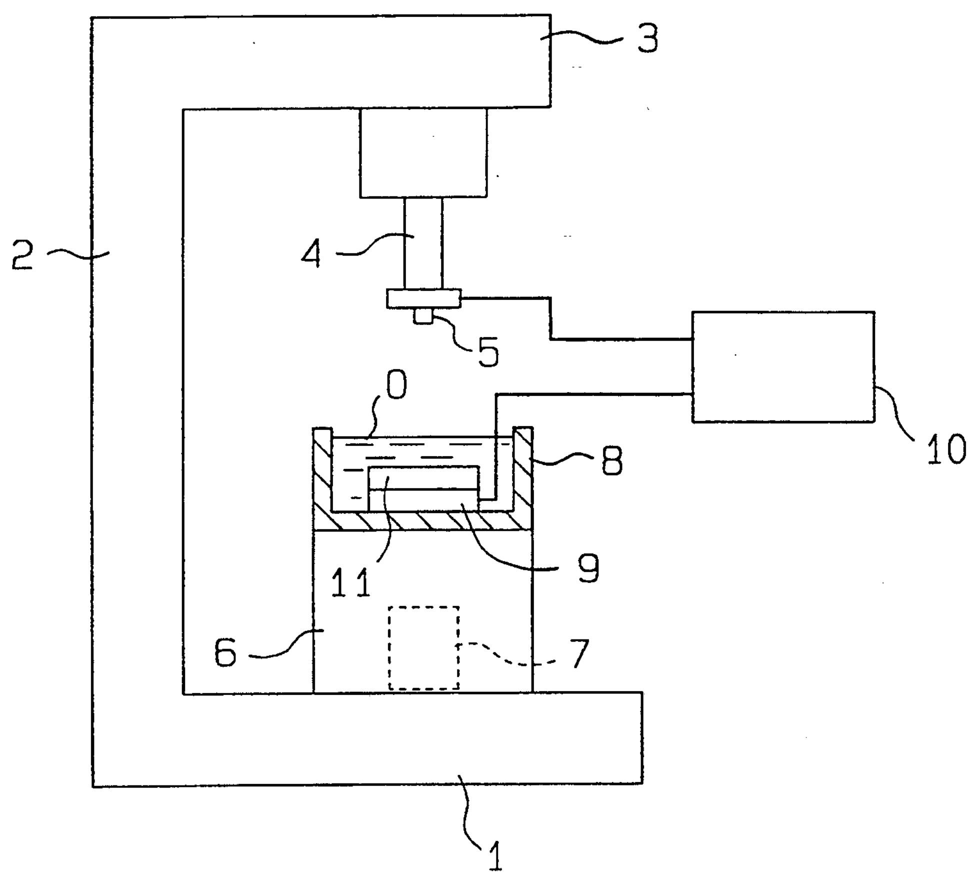
FIG. 3 is a front elevation of an electric discharge machine having the needlelike electrodes shown in FIGS. 1 and 2.

Electrical discharge machining using a spark-machining electrode according to the invention is next described by referring to FIGS. 1–6. As shown in FIG. 3, a pole 2 extends upright from a bed 1. A support arm 3 is held horizontally to the upper end of the pole 2. A support plate 4 is rigidly mounted to the lower surface of the arm 3 and depends from it. A spark-machining electrode 5 forming a first embodiment of the invention is removably mounted to the lower end of the support plate 4.

A support base 6 is mounted on the upper surface of the bed 1. A machining vessel 8 is mounted on the support base 6 in such a way that the vessel can be moved up and down by an elevating motor 7. A horizontal support plate 9 and a dielectric oil O are contained within the vessel 8. An electric discharge circuit 10 having a power supply for electrical discharge machining is connected between the support plates 9 and 4. A workpiece 11 is placed on the upper horizontal support plate 9. A given voltage is applied between the support plates 4 and 9 from the electric discharge circuit 10. The workpiece 11 is moved upwardly together with the machining vessel 8 toward the spark-machining electrode 5, whereby the workpiece 11 is machined by electrical discharge machining.

Figure 4:
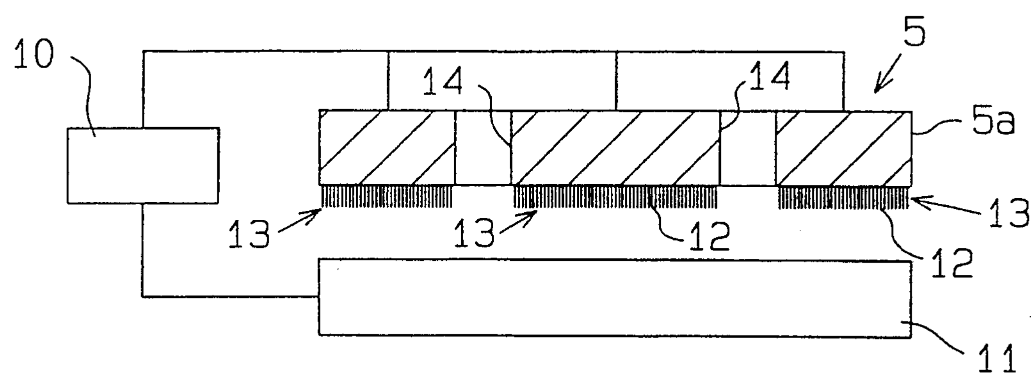
FIG. 4 is a cross-sectional view of the spark-machining electrode shogun in FIGS. 1 and 2.
Figure 5:
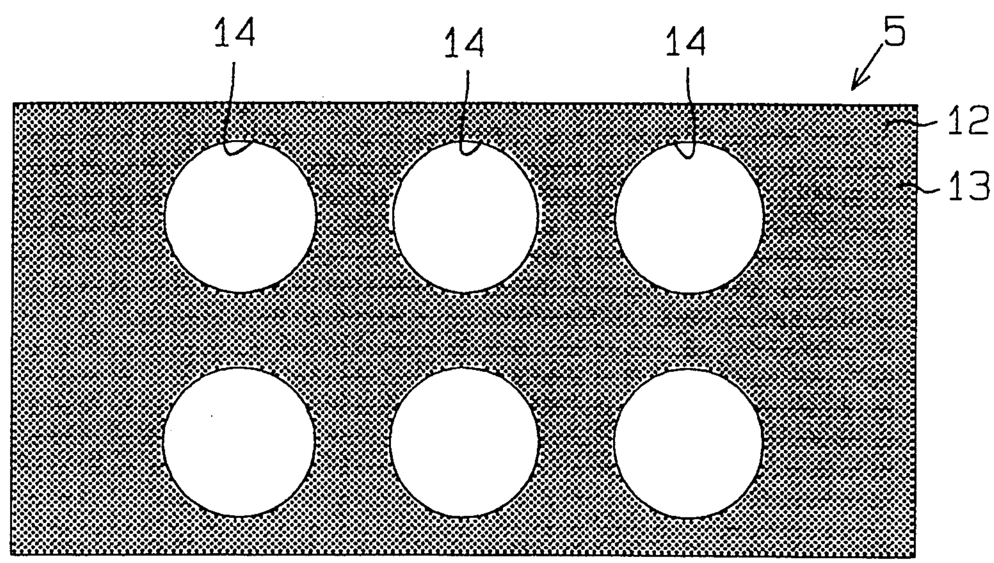
FIG. 5 is a plan view of the spark-machining electrode shown in FIG. 4.
Figure 6:
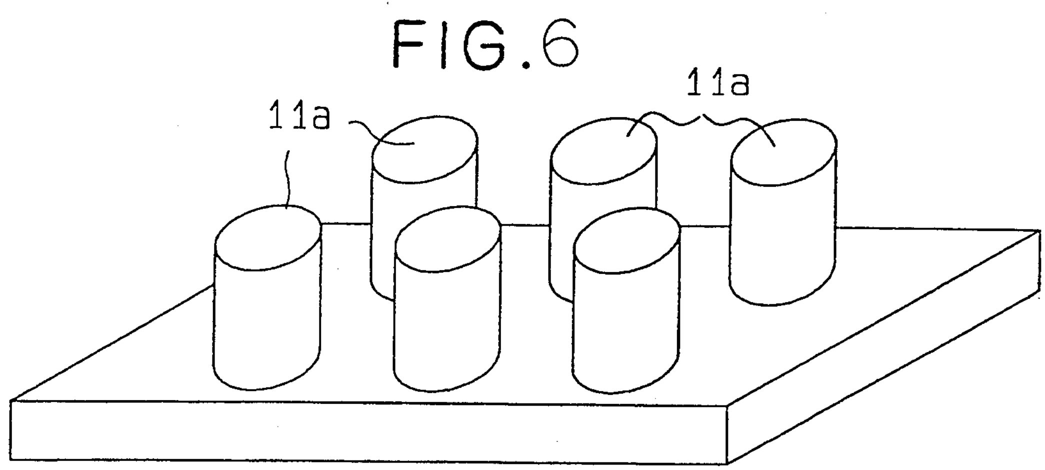
FIG. 6 is a perspective view of a workpiece machined by the spark-machining electrode shown in FIG. 4, showing the obtained shapes.

FIG. 4 is a cross-sectional view of the above-described spark-machining electrode 5. FIG. 5 shows the structure of the surface of the spark-machining electrode 5. The electrode 5 has a base plate **5*i a* on which a number of needlelike electrodes 12 are arranged closely at a given density so as to form needlelike electrode groups 13. In this embodiment, a desired shaped is formed on one electrode group 13 to machine the workpiece 11** into the desired form by electrical discharge machining.

The spark-machining electrode 5 shown in FIGS. 4 and 5 is manufactured in the manner described now. First, the needlelike electrode groups 13 are formed on the electric discharge surface of the base plate **5*a* of the spark-machining electrode by photolithography techniques used in semiconductor fabrication processes in such a way that each needlelike electrode 12 has a depth H of 5 microns and a diameter D of 2 microns and that the spacing g between adjacent electrodes 12 is 1 micron, as shown in FIG. 1. Then, circular holes 14** having a diameter L of several millimeters are formed on the rear surface of the base plate *5a* of the electrode by electrical discharge machining.

The method of fabricating the spark-machining electrode 5 is now described in detail. The base plate *5a* of this electrode 5 is made of tungsten (W). A photosensitive resin such as a photoresist is applied to the surface of the base plate *5a* forming an electric discharge surface. The resin is then exposed, using a photomask having desired shapes. The resin is developed. Thus, the shapes of the photomask used to fabricate the needlelike electrode groups 13 are transferred to the photosensitive resin.

Thereafter, the base plate *5a* of the spark-machining electrode is etched, using the photosensitive resin as a masking material. In this way, the needlelike electrode groups 13 are formed on the whole electric discharge surface of the base plate *5a*. Extraction holes 14 of a desired shape is machined in the rear surface of the electrode base plate *5a* by electrical discharge machining. The etching described above and etching described later may be either a wet chemical etching process using a liquid or a dry etching process using a plasma gas.

The obtained spark-machining electrode 5 is mounted on the electrical discharge machine shown in FIG. 3 and disposed at a given distance from the workpiece 11 to be machined. A voltage is applied from the electric discharge circuit 10. The machining vessel 8 is elevated by the elevating motor 7. In this manner, the machining operation illustrated in FIG. 2 is performed. Then, the workpiece 11 is machined into the forms shown in FIG. 6. As shown in FIG. 2, under this condition, the front ends of the needlelike electrodes 12 create concentration of electric field and can easily produce an electric discharge. Therefore, an electric discharge is produced at the front ends of the electrodes 12. An electrical discharge machining process which leaves the cylindrical portions *11a* on the workpiece 11 is carried out through the holes 14 in one operation without using a scanning mechanism. Since the needlelike electrodes 12 exist in the craters formed by the electric discharges produced by their respective adjacent electrodes 12, the shapes of the electrodes 12 are not transferred to the workpiece 11. In other words, the workpiece does not enter between the adjacent needlelike electrodes 12.

The energy (in joules) of a single electric discharge from each needlelike electrode 12 is given by $$E=(\tfrac{1}{2})\times C\times V^2 \quad (1)$$

where C is the capacitance, and V is the applied voltage. The capacitance C is given by $$C=\epsilon\times\epsilon_0\times(S/d) \quad (2)$$

where $\epsilon$ is the dielectric constant of the dielectric oil O, $\epsilon_0$ is the dielectric constant of vacuum, S is the area of the front end surface of each needlelike electrode 12, and d is the distance between the electrode 12 and the workpiece 11. Therefore, the energy E of the electric discharge can be reduced by reducing the area of the front end surface of each needlelike electrode 12. Also, the accuracy at which the workpiece 11 is machined can be enhanced.

In this first embodiment, the region of the spark-machining electrode 5 in which an electric discharge should be produced is formed into the needlelike electrode groups 13. This facilitates generation of an electric discharge between the front end of each needlelike electrode 12 and the workpiece 11. In the regions where no electric discharge should be produced, i.e., on the side surfaces of the outermost needlelike electrodes 12 of the electrode groups 13, electric discharge with the workpiece can be prevented. This also improves the machining accuracy.

Furthermore, the area of the surface of the spark-machining electrode is increased, because the surface of the spark-machining electrode 5 is shaped into the needlelike electrode groups 13. Since the dielectric oil O enters the gaps g between the adjacent electrodes 12, the heat created during the electric discharge can be effectively dissipated. This also improves the machining accuracy. Additionally, the gaps g in the electrode group 13 permit the sludge created during the electric discharge to be expelled more effectively.

Figure 7:
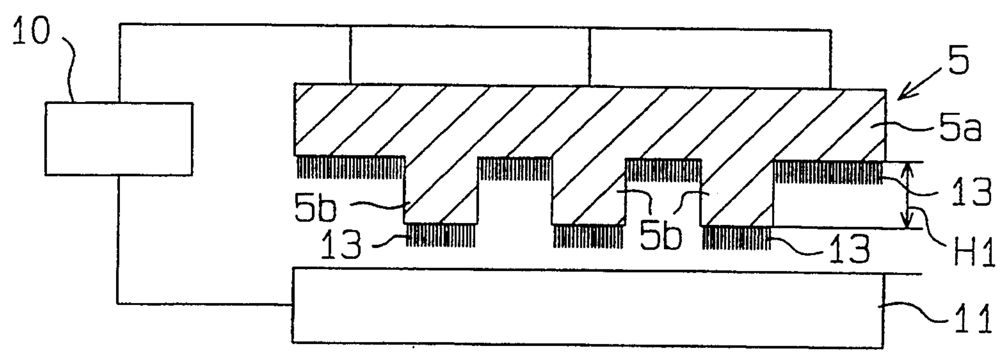
FIG. 7 is a cross-sectional view of another spark-machining electrode according to the invention.
Figure 8:
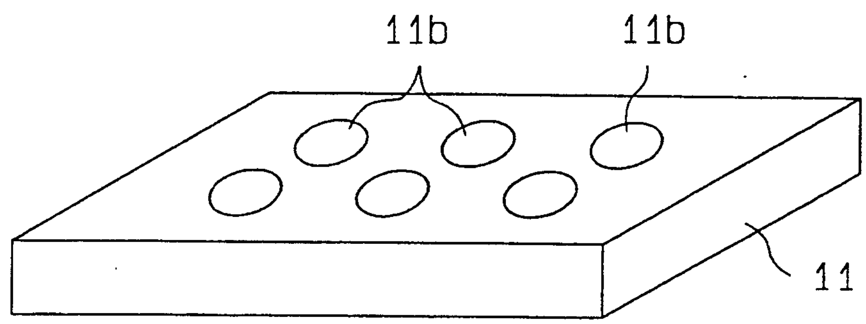
FIG. 8 is a perspective view of a workpiece machined by the spark-machining electrode shown in FIG. 7, showing the obtained shapes.

A second embodiment of the invention is next described by referring to FIGS. 7 and 8. FIG. 7 is a cross-sectional view of main portions of an electrode 5 for electrical discharge machining. The electrode 5 forms the second embodiment of the invention and has needlelike electrode groups 13. To fabricate this electrode 5, cylindrical portions *5b* having a depth H1 of 100 microns are formed on the surface of the base plate *5a* of the spark-machining electrode 5 by photolithographical techniques. Then, the needlelike electrode groups 13 consisting of the needlelike electrodes 12 are formed on the base plate *5a* and on the front end surfaces of the cylindrical portions *5b*. In the same way as in the electrode groups 13 of the first embodiment, the electrode groups 13 are so formed that the depth H of the electrodes 12 is 5 microns, the diameter D of the electrodes 12 is 2 microns, and the spacing g between the adjacent electrodes 12 is 1 micron.

The method of fabricating this spark-machining electrode is now described in detail. The base plate *5a* of the spark-machining electrode 5 is made of tungsten. A photosensitive resin such as a photoresist is applied to the surface of the base plate *5a* forming an electric discharge surface. The resin is then exposed, using a photomask having the desired shapes, i.e., the shapes of the cylindrical portions *5b*. The resin is developed. Thus, the shapes of the photomask is transferred to the photosensitive resin.

Thereafter, the tungsten electrode plate *5a* is etched, using the photosensitive resin as a masking material. In this way, the cylindrical portions *5b* are formed on the plate *5a*. Again, a photosensitive resin such as a photoresist is applied to the base plate *5a* and to the electric discharge surfaces of the cylindrical portions *5b*. The resin is exposed, using a photomask having the shapes for fabricating the needlelike electrode groups 13. The resin is then developed to transfer the shapes of the photomask to the resin, the photomask being used for formation of the needlelike electrode groups 13. Using the photosensitive resin as a masking material, the tungsten base plate *5a* and the front end surfaces of the cylindrical portions *5b* are etched to form the desired needlelike electrode groups 13.

As shown in FIG. 8, circular holes *11b* can be accurately spark-machined in the workpiece 11 by means of the electrical discharge machine shown in FIG. 3, using the obtained spark-machining electrode 5.

Figure 9:
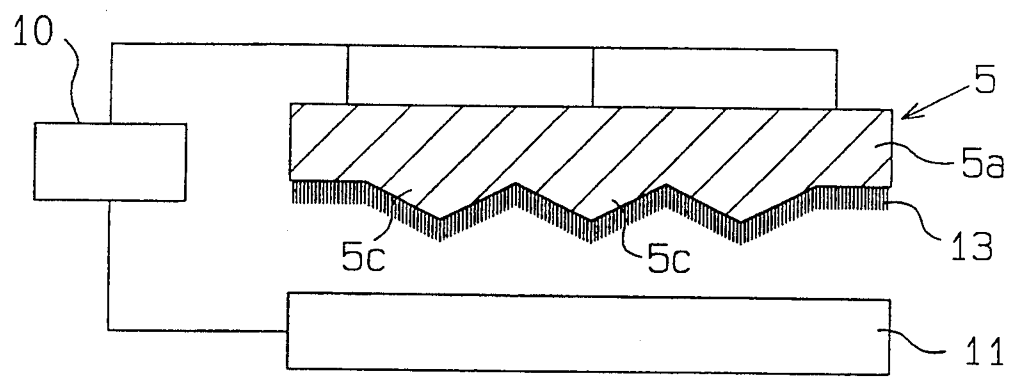
FIG. 9 is a cross-sectional view of a still other spark-machining electrode according to the invention, showing the obtained shapes.
Figure 10:
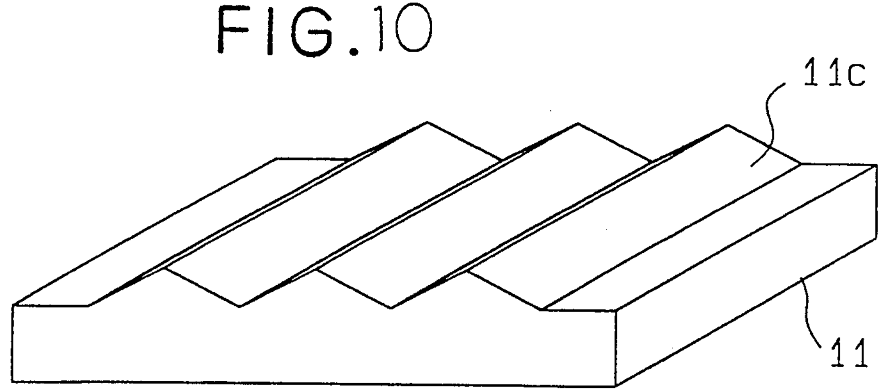
FIG. 10 is a perspective view of shapes formed on the workpiece by the spark-machining electrode shown in FIG. 9.
Figure 11:
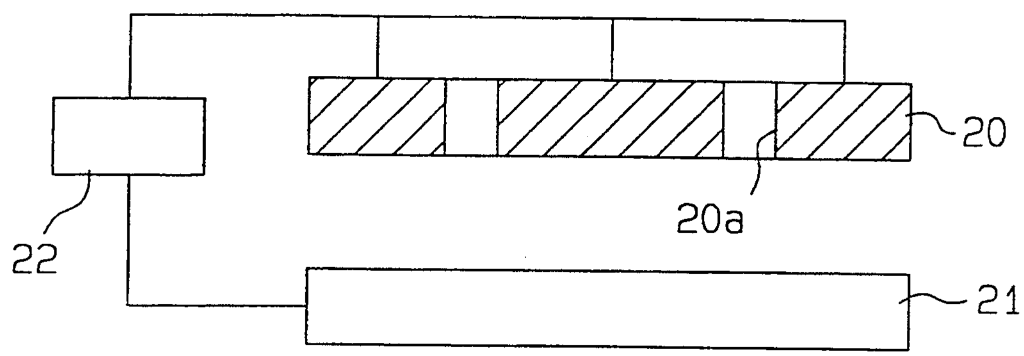
FIG. 11 is a cross-sectional view of the prior art flat-plate electrode used for electrical discharge machining.
Figure 12:
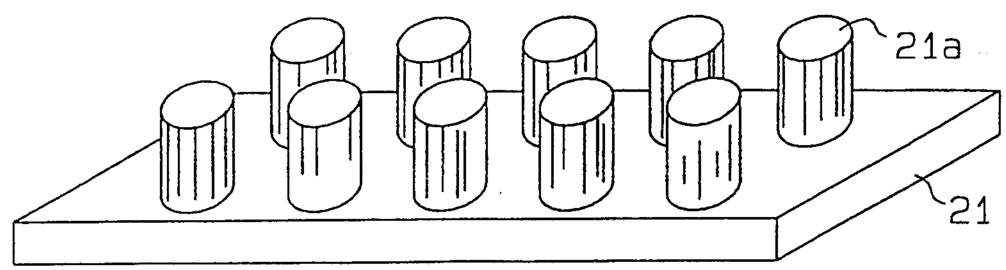
FIG. 12 is a perspective view of a workpiece machined by the spark-machining electrode shown in FIG. 11.

A third embodiment of the invention is next described by referring to FIGS. 9 and 10. FIG. 9 is a cross-sectional view of main portions of an electrode 5 used for electrical discharge machining, the electrode 5 having needlelike electrode groups 13. The surface of the spark-machining electrode 5 is entirely covered with the needlelike electrodes 12 forming one group 13. The needlelike electrodes 12 of this group 13 have mildly varying heights.

Figure 13:
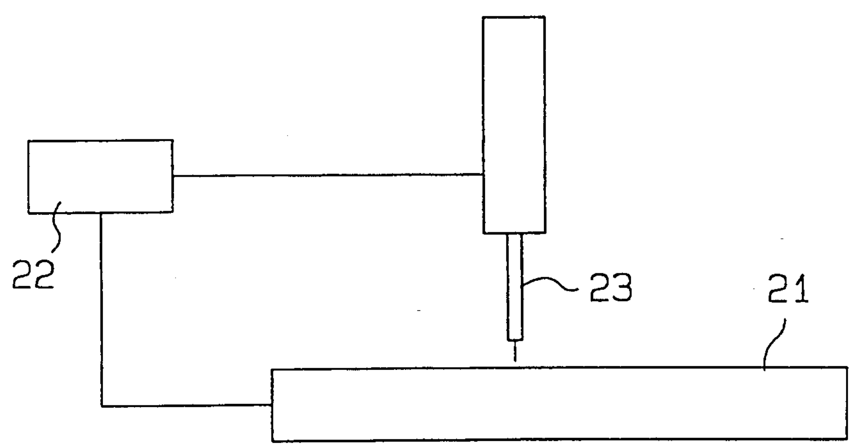
FIG. 13 is a cross-sectional view of the prior art single needlelike electrode used for electrical discharge machining.
Figure 14:
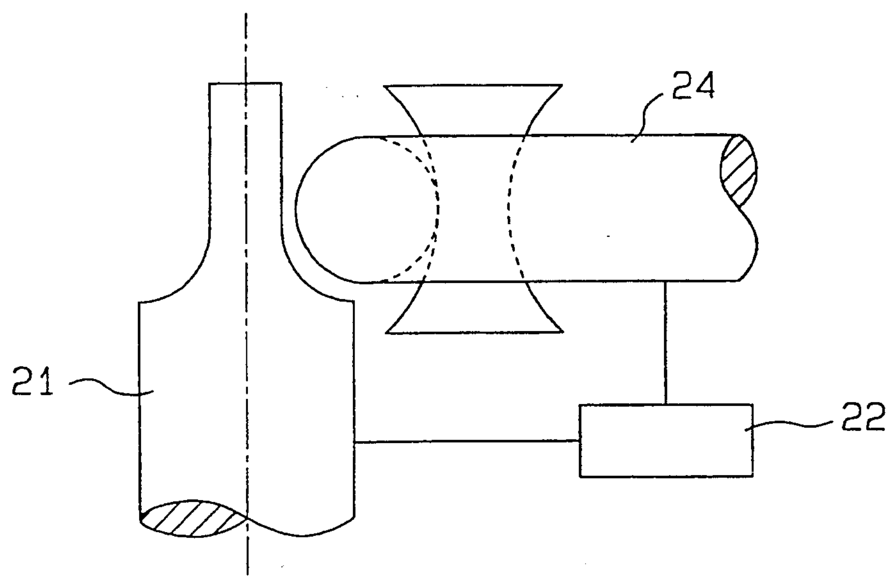
FIG. 14 is a cross-sectional view of the prior art wire electrode used for electrical discharge machining.

The spark-machining electrode 5 shown in FIG. 9 is fabricated in the manner described now. The needlelike electrodes are scanned and spark-machined to form intricate three-dimensional shapes on the surface of the spark-machining electrode 5. Then, the needlelike electrode group 13 is fabricated photolithographically in such a way that the depth H of each electrode 12 is 5 micron, the diameter D of each electrode 12 is 2 microns, and the spacing g between the adjacent electrodes 12 is 1 micron. More specifically, mild slopes 5*c* are formed at plural locations on the electric discharge surface of the tungsten base plate 5*a* through the use of the electrical discharge machine shown in FIG. 13. A photosensitive resin such as a photoresist is applied to the base plate 5*a* and to the electric discharge surfaces of the slopes 5*c*. Subsequently, the resin is exposed, using a photomask having shapes for fabricating the electrode group 13. The resin is developed, whereby the shapes of the photomask are transferred to the resin.

Finally, the tungsten base plate is etched, using the photosensitive resin as a masking material. Thus, the desired electrode group 13 is formed on the electric discharge surfaces of the slopes 5*c* and on the tungsten base plate 5*a*.

The workpiece 11 is spark-machined, using the obtained spark-machining electrode 5. As a result, as shown in FIG. 10, the plural mild slopes 11*c* can be formed accurately on the surface of the workpiece 11 at a time.

In the above embodiments, the diameter D of the needlelike electrodes 12 are set to 2 microns. The needlelike electrodes 12 can be made thinner by adopting a modified method. If these thinner electrodes are used, the machining accuracy can be enhanced further.

As described in detail thus far, by using any of the novel spark-machining electrodes, the capacitance can be reduced compared with the case in which the prior art flat-plate electrode is used. Consequently, the energy of a single electric discharge can be reduced. By the effect of the concentration of electric field, the electric discharge occurs principally at the front end surfaces of the needlelike electrodes. This suppresses electric discharge at the side surfaces. For these reasons, the accuracy of electrical discharge machining can be made comparable to the accuracy obtained by the use of the prior art single needlelike electrode. Furthermore, a complicated mechanism for scanning the spark-machining electrode or the workpiece can be dispensed with. This allows the electrical discharge machine to be made smaller and lighter in weight. Further, the machining time can be shortened, since the workpiece can be machined in one electrical discharge machining process. This results in an improvement in the productivity.

In addition, the area of the electric discharge surface is increased. This enhances the cooling and cleaning effects on the spark-machining electrode, thus improving the durability of the electrode. Also, the accuracy at which the workpiece is machined is improved.

Moreover, the workpiece can be accurately machined into the desired form by appropriately arranging the needlelike electrodes, i.e., by adequately contriving the whole shape of the spark-machining electrode. For example, convex portions conforming to the holes formed inside the needlelike electrode groups can be formed simultaneously in the workpiece accurately. Also, concave portions conforming to the separate shapes of needlelike electrode groups can be machined in the workpiece simultaneously. Further, desired convex or concave shapes of needlelike electrode groups can be accurately formed in the workpiece simultaneously.

What is claimed is:

1. An electrode for electrical discharge machining, comprising:

a base plate on which a plurality of needlelike electrodes forming at least one electrode group are mounted, the needlelike electrodes being present in craters formed by the electric discharges produced by their respective adjacent needlelike electrodes.

2. The electrode of claim 1, wherein said base plate of the electrode and the group of the needlelike electrodes have holes larger than the craters formed by the electric discharges.

3. The electrode of claim 1, wherein said needlelike electrodes form plural groups of electrodes, and wherein these groups are spaced apart from each other such that the craters formed by the adjacent groups of the needlelike electrodes are spaced apart from each other.

4. The electrode of claim 1, wherein said needlelike electrodes have varying heights.

5. An electrical discharge machine comprising:

a pedestal on which a workpiece to be machined is placed;

a spark-machining electrode used for electrical discharge machining and mounted opposite to the pedestal;

a plurality of minute needlelike protrusions formed on a surface of the spark-machining electrode which is opposite to the pedestal, the needlelike protrusions being present in craters created by their respective adjacent needlelike protrusions; and an electric discharge circuit connected with the pedestal and with the spark-machining electrode to produce an electric discharge between each needlelike protrusion and the workpiece.

6. The electrical discharge machine of claim 5, wherein said spark-machining electrode has plural groups of the needlelike protrusions, the groups being arranged in a pattern on the surface of the spark-machining electrode.

7. The electrical discharge machine of claim 6, wherein holes greater than said craters are formed in the spark-machining electrode and in the needlelike protrusion groups in said pattern.

8. The electrical discharge machine of claim 6, wherein said needlelike protrusion groups vary in height to form said pattern.

* * * * *